United States Patent Office 3,532,983
Patented Oct. 6, 1970

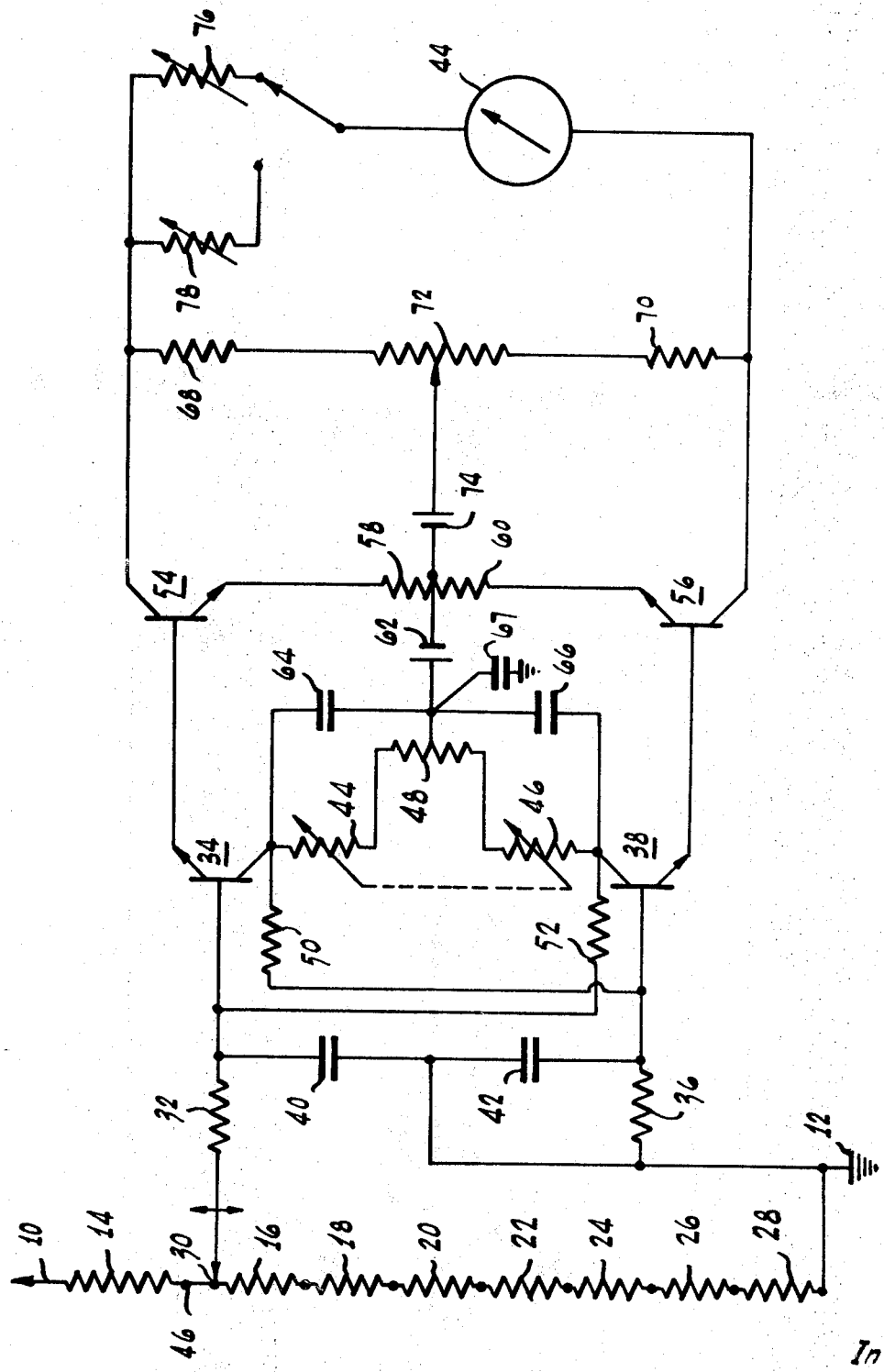

3,532,983
HIGH INPUT IMPEDANCE SOLID STATE D.C. AMPLIFIER SUITABLE FOR USE IN ELECTRICAL MEASUREMENT
Sander L. Knanishu, Tappan, N.Y., assignor to RCA Corporation, a corporation of Delaware
Filed Dec. 27, 1966, Ser. No. 604,932
Int. Cl. G01r 1/30; H03f 1/08, 1/36
U.S. Cl. 324—123                                       8 Claims

ABSTRACT OF THE DISCLOSURE

A high input impedance D.C. amplifier is disclosed in which a voltage to be measured is applied between the bases of two transistors and in which a direct current feedback path is provided between a main electrode of each transistor and the base of the other transistor, the load being coupled between the other main electrodes of the two transistors.

---

This invention relates to high input impedance solid state amplifiers. While such amplifiers have many uses, they are particularly useful in circuits for measuring current, voltage, or in multimeters, ohms.

When measuring the voltage appearing across a circuit element, for example, the measuring apparatus is connected across the element whereby the measuring apparatus shunts the element. The current required by the measuring apparatus changes the voltage appearing across the element and therefore prevents the measuring apparatus from providing a true indicatiton of the voltage being measured. Measurements of current flowing in a circuit or of the resistance of a circuit element are actually performed by measuring the voltage drop developed across a resistor. Therefore, the accuracy of measurement of voltage or current or ressistance is impaired by the fact that the measuring apparatus requires current for its operation. While voltmeters are known which will give a full scale deflection of the indicator element or needle thereof and only shunt a few micro-amperes from the circuit element the voltage across which is being measured, for many purposes the resulting measurement is not sufficiently accurate.

Vacuum-tube voltmeters, which have very high input impedances, are known in which the voltage to be measured is applied to the input of voltage controlled vacuum tubes comprising part of the meter, and in which the output of the vacuum tubes is applied to a microammeter. However, vacuum tube voltmeters have disadvantages. They are bulky, they are fragile, they require high voltage sources for operation and often high current, and they produce heat during operation which must be dissipated. Such disadvantages are not presented by transistor devices. However transistors are current controlled devices having low input impedances, whereby measuring apparatus including transistors would typically draw enough current during the measuring operation as to make the indication given by a voltmeter including transistors inaccurate.

It is an object of this invention to provide an improved multimeter including transistors.

It is another object of this invention to provide an improved transistorized high input impedance direct current transistor amplifier.

In accordance with one embodiment of this invention the voltage appearing at two points on a circuit element such as a resistor, which is a measure of a current, voltage or resistance to be measured, is applied to the respective control electrodes of two high beta transistors. The voltage appearing across the output electrode of each of the transistors is applied respectively back to the input electrode of the other of the two transistors. Means is provided whereby the current fed back to the respective control electrodes is substantially equal to the current drawn by the control electrodes from the circuit element, the voltage across which is being measured. Therefore, the current required by each of the transistors in their normal operation is supplied from the output electrode of the other of the two transistors and is not shunted around the circuit element whereby the transistors present very high input impedances. The output of the two transistors may be applied to input electrodes of other transistors for amplification and the voltage developed in a resistor connected between the output electrodes of the other transistors can be measured, as by a high impedance voltmeter, to provide an accurate measure of the difference in voltage appearing at the above-mentioned two points.

The invention may be better understood upon reading the following description together with the acompanying drawing in which the sole figure is a circuit diagram of a voltmeter, which may be used to measure voltage, current or ohms, and which includes the amplifier of this invention.

A probe, indicated by the arrow 10, comprising part of the voltmeter to be described, is provided for application to the point, not shown, at which the voltage with respect to a reference point 12 is to be measured. A plurality of range resistors 14, 16, 18, 22, 24, 26 and 28 are connected between the probe 10 and the reference point 12. A multiposition range switch point 30 is connected to any one of the junction points between the several resistors 14, 16, 18, 20, 22, 24, 26 and 28. The switch 30 is connected through an isolation and current limiting resistor 32 to the base of a high beta silicon NPN transistor 34. The reference point 12 is connected through another similar resistor 36 to the base of a second high beta silicon NPN transistor 38. Two filter capacitors 40 and 42 are connected in series between the bases of the transistors 34 and 38 to shunt any alternating current away from the transistors 34 and 38. The junction of the capacitors 40 and 42 is cinnected to the reference point 12. By changing the position of the switch point 30, a fractional portion of the voltage appearing across the probe 10 and the reference point 12 is applied between the bases of the transistors 34 and 38. As is known, the position of switch point 30 is so chosen that the swing of the indicator needle of a meter 44 forming part of the meter to be described is a maximum for the voltage differences applied between the bases of the transistors 34 and 38, and yet this voltage is not such to cause the needle to swing off the scale of the meter 44.

The collectors of the transistors 34 and 38 are connected together through two variable resistors 44 and 46 and an intermediate potentiometer 48. The resistors 44 and 46 are unicontrolled in such a manner that their resistances are kept equal as they are varied. Also, the collector of the transistor 34 is connected to the base of the transistor 38 through a feedback resistor 50 and the collector of the transistor 38 is connected to the base of the transistor 34 through a feedback resistor 52, the resistors 50 and 52 being equal. The resistors 50 and 52 are of a sufficiently high resistance value so as to avoid oscillation by too high feedback. Furthermore, the transistors 34 and 38 are chosen to have substantially equal betas. It will be noted that the feedback from a collector to a base is in a positive direction, that, is the feedback changes in the same direction as the voltage applied to the base of the transistor changes and this feedback is applied from the collector of one transistor to the base of the other transistor.

The emitters of the transistors 34 and 38 are respectively connected to the bases of two high beta silicon NPN transistors 54 and 56. The emitters of the transistors 54 and 56 are connected together through equal resistors 58 and 60 in series and the junction of the resistors 58 and 60 is connected to the negative terminal of a battery 62 whose positive terminal is connected to a slider on the potentiometer 48. Equal by-pass capacitors 64 and 66 are connected in series between the collectors of the transistors 34 and 38. The junction point of the capacitors 64 and 66 is connected to the slider of the potentiometer 48. A capacitor 67 is connected from the slider 48 to the point of reference potential. The battery 62 therefore energizes the transistors 34 and 38 by way of the base-to-emitter paths of the transistors 54 and 56, respectively, and the output voltages appearing on the emitters of the transistors 34 and 38 are applied respectively to the bases of the transistors 54 and 56. The transistors 54 and 56 are chosen to have substantially the same beta value. The collectors of the transistors 54 and 56 are connected together through equal series resistors 68 and 70 and an intervening potentiometer 72. The slider of the potentiometer 72 is connected to the positive terminal of a battery 74 whose negative terminal is connected to the junction of the resistors 58 and 60. A meter 44 is connected through either a variable resistor 76 or 78, as determined by the position of a switch 80, across the collectors of the transistors 54 and 56. The resistors 76 and 78 provide calibration of the scale of the meter 44 for different voltage ranges of the described measuring apparatus.

The operation of the described measuring circuit including a high input impedance amplifier is as follows:

Since, as pointed out above, the measurement of current or resistance by the described circuit actually comprises a voltage measurement, the voltage measuring operation only of the circuit is described. Upon connecting the probe 10 and the reference point 12 across a voltage to be measured, the voltage applied to the base of the transistor 34 increases in a positive direction with respect to the base of the transistor 38, and the voltage applied to the base of the transistor 38 increases in a negative direction or decreases with respect to the base of the transistor 34. Then the current flowing through the collector of the transistor 34 increases and the current flowing through the collector of the transistor 38 decreases. The voltage of the collector of the transistor 34 decreases and the voltage on the colletcor of the transistor 38 increases. Due to the decrease in voltage at the collector of the transistor 34, the voltage at the base of the transistor 38 is driven more negative. Current is fed back to the base of the transistor 38 through the circuit, starting with the collector of the transistor 34, and including the resistor 50, the base-to-emitter path of the transistor 38, the base-to-emitter path of the transistor 56, the resistor 60, the battery 62, the upper portion (as viewed in the figure) of the potentiometer 48 and the resistor 44. Upon proper adjustment of the resistors 44 and 46, and the position of the slider of the potentiometer 48, the current flow caused by this decrease in voltage at the collector of the transistor 34 is substantially equal to the current flow drawn by the base of the transistor 38 in its normal operation, whereby the transistor 38 draws no current from the resistors 14, 16, 18, 20, 22, 24, 26 and 28, and therefore this transistor 38 acts as if it had substantially infinite input impedance. Similarly, the increase in voltage at the collector of the transistor 38 causes a greater current to flow to the base of the transistor 34 by way of the resistor 52, the base-to-emitter path of the transistor 34, the base-to-emitter path of the transistor 54, the resistor 58, the battery 62, the other portion of the potentiometer 48 and the resistor 46, and this current is substantially equal to the current drawn by the base of the transistor 34, whereby the transistor 34 draws no current from the resistors 14, 16, 18, 20, 22, 24, 26 and 28, and the transistor 38 also acts as if it had substantially infinite input impedance. The current variations in the emitters of the transistors 34 and 38 are connected to drive the amplifying transistors 54 and 56, respectively. Since the emitters of the transistors 34 and 38 are connected to drive the bases of the transistors 54 and 56, the fact that the current necessary to drive the transistors 54 and 56 is taken from the transistors 34 and 38 does not affect the feedback of current to the bases of the transistors 34 and 38. Also the voltage drop across the resistor 58 provides a negative feedback between the emitter and base of the transistor 54, while the voltage drop across the resistor 60 provides a negative feedback between the emitter and base of the transistor 56. These negative feedbacks introduce high input impedance at the bases of the two transistors 54 and 56, reducing the loading effect of the transistors 54 and 56 on the emitters of the transistors 34 and 38 respectively.

In summary, the transistors 34, 38 serve two purposes. Each transistor provides a controlled positive feedback from the collector to the base of the other through the cross-coupling, providing a near infinite impedance at the inputs. Also, they serve as preamplifiers through the emitters, driving the bases of the transistors 54, 56. Transistors 54, 56 introduce a negative feedback through the emitter resistors 58, 60, producing high input impedance at their bases hence preventing the emitters of the transistors 34, 38 from loading. Transistors 54, 56 also serve as amplifiers for driving the meter or other suitable load.

While the voltmeter function of the above circuit has been particularly described, the circuit may also be used to measure amperes or ohms in a known manner. For example, if a current is to be measured, the probe 10 and the reference point 12 may be connected in series with the circuit, the current flow through which is to be measured. However one or more very small resistors (not shown) in series will be substituted for the resistances 14, 16, 18, 20, 22, 24, 26 and 28, by a known switching means. The voltage across one or more of the very small resistors may be applied to the bases of the transisors 34 and 38 by manipulation of a switch point such as the switch point 30 and the meter 44 may be read. If a resistance is to be measured, a local voltage source such as a battery may be connected in series with any one of a plurality of standard or reference resistors (not shown) and with the element whose resistance is to be measured by a known switching means. The voltage developed across the element whose resistance is to be measured may be applied between the bases of the transistors 34 and 38. In either case, knowing the position of the switch point 30 and knowing whether voltage, current or resistance is being measured, the position of the indicating needle of the meter 44 will provide an accurate indication of the unknown value being measured.

Among the features and avantages of the described high input impedance amplifier and multimeter are the following:

(1) By appling the input signals directly to the two bases of the input transistors 34 and 38 which may be silicon transistors, advantage is taken of the high collector to base isolation and low leakage properties of the silicon NPN transistors.

(2) Unlike the conventional differential amplifier where the input voltage is applied between a base and an emitter of a transistor which is connected in a common emitter configuration including a common emitter resistor, the adjustment of the circuit of transistors 34 and 38 is independent of the balance of the output transistors 54 and 56. Also unlike conventional differential amplifiers, the described circuit has zero offset voltage at its input within its linear range of operation.

(3) Cross coupling of collectors to bases in combination with the variable collector resistors 44 and 46 provides the input circuit with a balanced and controlled positive feedback, whereby it is possible to approach infinite impedance at the input.

(4) Since the stability and accuracy of the described circuit depends primarily on the preamplifier including the transistors 34 and 38, and since the current drain on this preamplifier is very small, in the order of micro-amperes, by using separate batteries 62 and 74, it is possible to get nearly shelf-life service from the battery 62 while the battery 74 can drop in voltage as much as up to 25 percent without change in the accuracy of the described multimeter.

While variations of the above-described apparatus will be evident to a person skilled in the art, the above description is to be considered as descriptive and not in a limiting sense.

What is claimed is:

1. A high input impedance direct current amplifier comprising:
   a pair of transistors each having a first and a second main electrode and a control electrode,
   resistor means connected between a first main electrode of one transistor of said pair and a first main electrode of the other transistor of said pair,
   a direct current feedback path including a lumped feedback resistor connected between the control electrode of one of said transistors and the said first main electrode of the other of said transistors,
   a second direct current feedback path including a second lumped feedback resistor connected between the control electrode of the other of said transistors and the first main electrode of said one of said transistors,
   a voltage source having one terminal connected to a point on said resistor means,
   respective impedance means connecting the other terminal of said source to said second main electrodes, and
   means for applying an input voltage between said control electrodes such that current is fed back to the control electrodes of said two transistors through said feedback resistors in a manner to raise the input impedance of said amplifier.

2. The invention as expressed in claim 1 in which said transistors are of the NPN type and in which said control electrode are the bases of said transistors, said first main electrodes are the collectors and said second main electrodes are the emitters of said transistors.

3. The invention as expressed in claim 1 in which said transistors are of the NPN type and in which said control electrodes are the bases of said transistors, said first main electrodes are the collectors and said second main electrodes are the emitters of said transistors and in which said respective impedances include resistors.

4. The invention as expressed in claim 1 in which a third and a fourth transistor are provided, said third and fourth transistors each having a control electrode and a first and a second main electrode and in which one of said respective impedances comprises a resistor and the internal control electrode to first main electrode path of said third transistor, and in which another of said respective impedances comprises a further resistor and the internal control electrode to first main electrode path of said fourth transistor and in which an output means is provided between the second main electrodes of said third and fourth transistors.

5. The invention as expressed in claim 4 in which an additional voltage source is connected to apply operating current between the first and second main electrodes of said third and fourth transistors.

6. The invention as expressed in claim 5 in which said connection of said additional voltage source includes additional resistance means connected between the second main electrodes of said third and fourth transistors, and in which a first terminal of said additional source is connected to a point on said additional resistance means and in which another terminal of said additional source is connected to a terminal of said first-mentioned voltage source, said output means being connected across said additional resistance means.

7. A high input impedance transistorized multimeter comprising:
   a first and second transistor each having a base, an emitter and a collector electrode,
   means for applying a voltage which is proportional to an unknown value to be measured between the bases of said first and second transistors,
   respective direct current feedback paths including respective resistors connected to provide cross coupling between the collectors and bases of said first and second transistors,
   a resistance means connected between the collectors of said first and second transistor means, and
   metering means coupled to the emitters of said first and second transistors and to said resistance means.

8. The multimeter expressed in claim 7 in which said metering means includes:
   a third and a fourth transistor each having a base, an emitter and a collector,
   means for respectively connecting the emitters of said first and second transistors to the bases of said third and fourth transistors,
   a second resistance means connected between the emitters of said third and fourth transistors,
   a first current supply,
   means for connecting said first current supply between said first resistance means and said second resistance means,
   a third resistance means connected between the collectors of said third and fourth transistors,
   a second current supply,
   means for connecting said second current supply between said second resistance means and said third resistance means, and
   a meter connected across said third resistance means.

References Cited

UNITED STATES PATENTS

| | | | |
|---|---|---|---|
| 2,768,250 | 10/1956 | Stachwra | 330—121 |
| 3,260,947 | 7/1966 | Dorsman | 330—28 |
| 3,223,940 | 12/1965 | Early et al. | 330—30 XR |
| 3,363,177 | 1/1968 | Houghton | 324—123 |

RUDOLPH V. ROLINEC, Primary Examiner

E. F. KARLSEN, Assistant Examiner

U.S. Cl. X.R.

330—15, 28, 84